United States Patent [19]
Bilow

[11] 3,801,393
[45] Apr. 2, 1974

[54] MAKING AN INSULATED CABLE WITH POLYIMIDE TAPE

[75] Inventor: Norman Bilow, Los Angeles, Calif.

[73] Assignee: Hughes Aircraft Company, Culver City, Calif.

[22] Filed: Oct. 20, 1972

[21] Appl. No.: 300,557

Related U.S. Application Data
[63] Continuation-in-part of Ser. No. 113,927, Feb. 9, 1971, abandoned.

[52] U.S. Cl.................. 156/56, 156/308, 156/331, 174/110 N, 174/120 SR
[51] Int. Cl. ........................................... H01b 13/10
[58] Field of Search...... 174/120 R, 120 SR, 110 N; 156/53, 56, 308, 331; 117/232

[56] References Cited
UNITED STATES PATENTS
3,617,617  11/1971  Katz............................. 174/120 SR
3,632,441  1/1972   Bilow............................. 117/232 X Primary Examiner—E. A. Goldberg
Attorney, Agent, or Firm—John A. Sarjeant

[57] ABSTRACT

The invention concerns electrical wire which has been wrapped with insulating tape using as a sealant a compound of the following chemical formula:

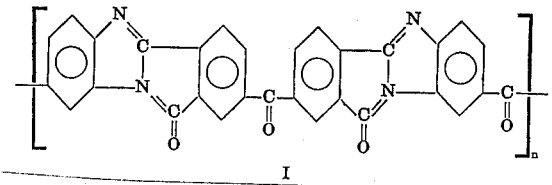

where $n$ is greater than one. The polymer is the reaction product of 3,3',4,4'-tetraaminobenzophenone and a 3,3',4,4'-tetraester of benzophenone tetracarboxylic acid. Wire which has been wrapped according to this invention has improved electrical properties and high temperature stability.

2 Claims, 2 Drawing Figures

Norman Bilow,
INVENTOR.

ATTORNEY.

MAKING AN INSULATED CABLE WITH POLYIMIDE TAPE

RELATED APPLICATION

This application is a continuation-in-part application of my co-pending application Ser. No. 113,927, filed Feb. 9, 1971 and now abandoned.

BACKGROUND OF THE INVENTION AND IMPROVEMENT

My invention is in the field of insulated electrical conductors using organic polymers as sealants or adhesives for insulating tape.

DESCRIPTION OF THE PRIOR ART

The need for insulation which is capable of withstanding high temperatures has become more acute through the years. To meet this need, chemists in industry have developed better and better forms of insulation. The best multifilament wire insulation in the current art is comprised of polyimide film bonded together with FEP type Teflon, a copolymer of tetrafluoroethylene and hexafluoropropylene. Such wire is rated as being limited to 392° F, although it appears to withstand slightly higher temperatures. The wire is limited in its temperature application because the FEP Teflon used in its construction has a glass transition temperature near 400° F, and it thus loses its sealing properties above this point. The problem is especially noted on wires with loose ends. The polyimide substrate used in the current state of the art wire can withstand 600° F temperature by itself, but it requires a sealant to use it as a wrap for multifilament wire.

A partial answer to this problem has been provided by my discovery of an improved high temperature resistant sealant which is produced by the polymerization of a tetra ester of benzophenone tetracarboxylic acid with an aromatic tetraamine. I have disclosed the preparation and use of this sealant in U.S. Pat. No. 3,632,441. The sealant has the following polymer structure:

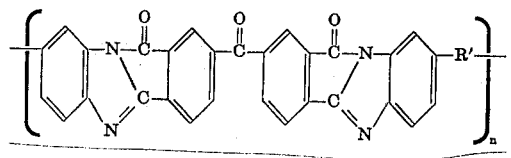

where R' is a direct bond, O, S, CH₂ or SO₂.

SUMMARY OF THE PRESENT INVENTION

My invention relates to the use of polymers of formula I as sealant for insulation-wrapped electrical wires and the improved electrical products obtained therefrom. The advantages of my invention are obtained by using thermosetting prepolymers of the above-described reaction wherein said prepolymers have an inherent viscosity from about 0.03 to 0.07, preferably 0.04 to 0.06, at 25° C when measured at a concentration of 2.5g per 100 cc of anhydrous dimethylformamide and calculating the inherent viscosity from the formula $$V_i = 2.303 \log_{10}(T_o/T_1)/C$$

where
$V_i$ = inherent viscosity in deciliters per gram.
$T_o$ = solvent elution time in sec.
$T_1$ = polymer solution elution time in sec.
$C$ = concentration expressed in grams per deciliter.

GENERAL DESCRIPTION OF THE INVENTION AND PREFERRED EMBODIMENTS

Figure 2:
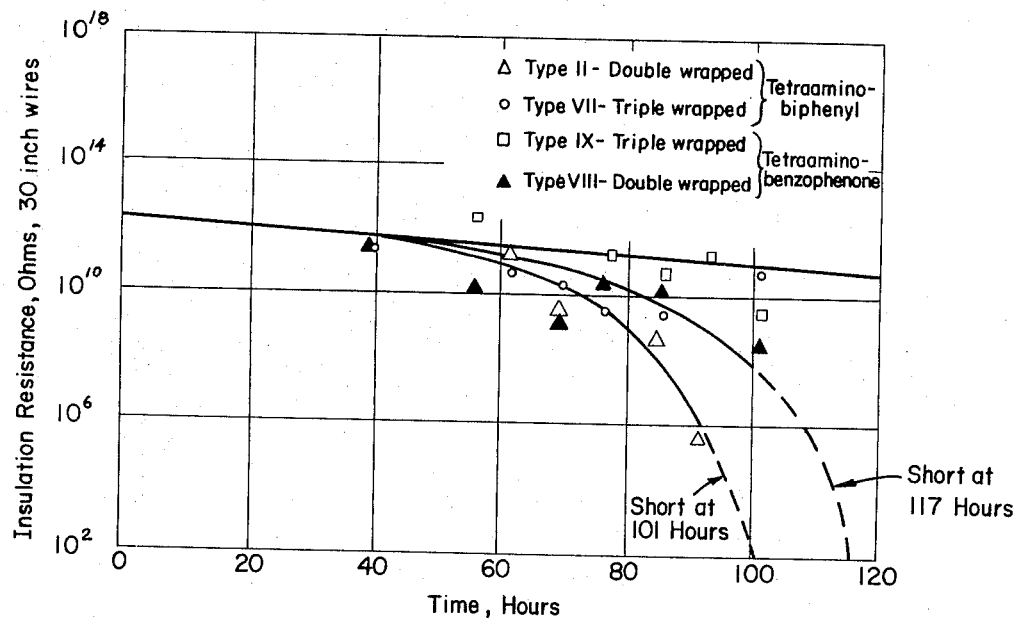
FIG. 2 is a graphical comparison illustrating the ambient temperature insulation resistance of polymide wrapped wire as a function of thermal aging in air at approximately 370° C wherein the sealant is (a) a polymer as described herein wherein one component of the preparative reaction is tetraaminobenzophenone vs (b) an analogous polymer in which the corresponding component is tetraaminobiphenyl.

The polymers useful herein are derived from the condensation of 3,3',4,4'-tetraaminobenzophenone with a tetraester of 3,3',4,4'-benzophenonetetracarboxylic acid.

The total synthesis is illustrated as follows, using the tetraethyl ester:

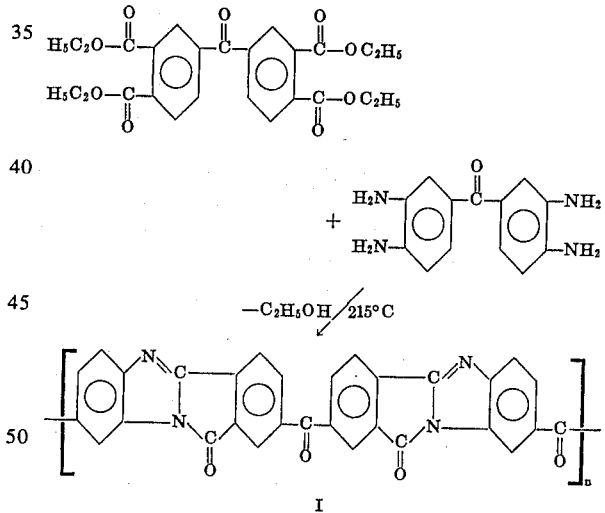

I where $n$ is greater than 1. The polymer development, however, is interrupted before the polymerization is complete to provide tractable resins which are soluble in organic solvents such as dioxane, dimethyl formamide, and chloroform. These intermediate resins have an inherent viscosity from about 0.03 to about 0.07, preferably from 0.04 to 0.06 when measured at 25° C at a concentration of 2.5 grams per 100 ml of anhydrous dimethyl formamide. Reaction times will vary somewhat depending on the tetraester and temperature, and whether a solvent is used. In general, I prefer to use temperatures at which the reactants are fluid, when no solvent is used, and reflux temperatures for solvent systems. Under these circumstances reaction times may vary from about 30 minutes to several hours.

Although I prefer to synthesize the polymers, using the tetraethyl ester, other lower alkyl esters may be used. For example, the tetramethyl ester and tetrapropyl ester may be used as well as mixed esters such as monomethyl triethyl ester, or diethyl dimethyl ester, and higher homologues thereof. These polymers can also be made by the reaction of benzophenone tetracarboxylic acid or its dianhydride with tetraaminobenzophenone, but when made directly from the acids or anhydrides they are much more difficult to process into useful insulation.

The synthesis method I prefer has an important advantage over other methods in that I can stop the polymerization at a convenient thermosetting polymer stage at which the product is most readily processed into electrical wire insulation. For instance, alcohol byproduct can be trapped, and the amount indicates the degree of condensation.

In order to obtain the improved electrical products of the present invention, one preferably uses the prepolymers disclosed herein in solution form. If the polymerization reaction has been carried out in a suitable solvent system such as chloroform the resultant lacquer may be used directly. In those instances where the reaction has not been carried out in a suitable solvent, the polymer is obtained in a dry form, directly from the cooled reaction mixture. The dried polymer is then preferably ground into a powder form and dissolved in a solvent such as dioxane, dimethyl formamide, or chloroform. Preferably, the solvent system will contain from about 20 percent to about 50 percent by weight of the polymer.

The prepolymer solvent system is then coated on one or both sides of appropriate insulating tape. I prefer to use polyimide tape such as that which is commercially available because this tape has high thermal stability. The tape can be coated in any number of conventional ways, such as brushing on the solution, dipping the tape into the solution, etc. I prefer to run the tape through the solution, thus wetting both sides. The wet tape may be dried and used directly to wrap electrical conductor wire, but in general it will be more practical to process it through a drying oven to provide a dry coated tape which may be wrapped on rolls and stored for future use. The drying oven may also be used to advance the degree of polymerization and degree of condensation in the coating, but the advancement should not be carried to the point where the polymer becomes intractable and infusible. I have found that a drying oven having a temperature from about 200° C to about 300° C with a residence time from approximately 1 to 4 minutes is adequate. The higher temperatures and longer residence times are used when the prepolymer has a lower inherent viscosity, e.g., 0.03. The lower temperatures and shorter residence times are more useful with prepolymers having higher inherent viscosities. One may use modifications of this process. For example, instead of passing the tape directly into a drying oven having a temperature in excess of 200° C, it can also be passed through a prestaging oven of lower temperature in order to eliminate most of the solvent.

The tape is applied to a wire by a conventional wire wrapping apparatus. I have found the optimum benefits are obtained with this tape when it is applied to multistrand electrical conductor wire such as 20 ga. 19/32 silver plated copper wire.

Figure 1:
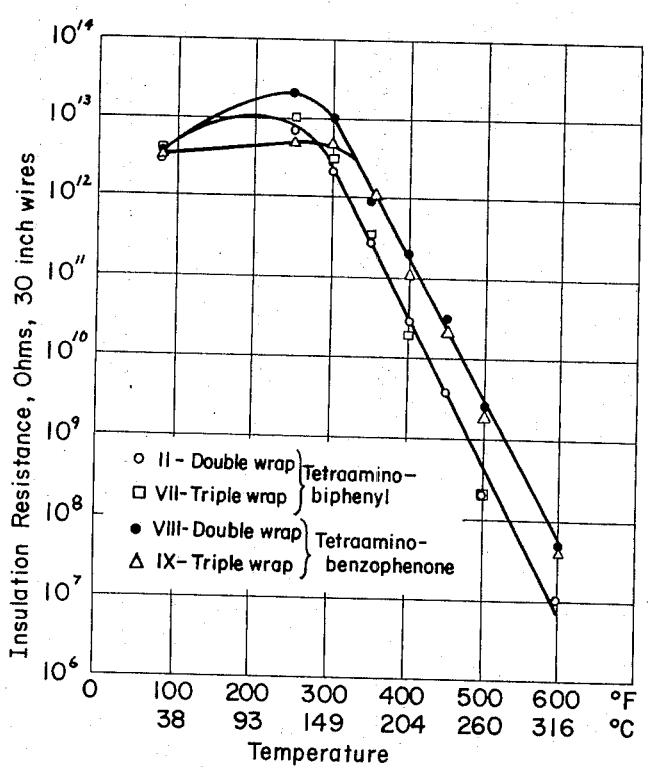
FIG. 1 is a graph illustrating a comparison of wire insulation resistance as a function of temperature of the herein described polymer material as sealant with the corresponding polymer derived from tetraaminobiphenyl.

FIGS. 1 and 2 graphically illustrate the improved electrical properties obtained with coated tapes of the present system in comparison with coated tapes obtained according to my invention disclosed in U.S. Pat. No. 3,632,441. The wires were double wrapped with two layers of coated polyimide tape in which the layers were wrapped in opposite directions with each layer having an overlap of approximately 50%. In order to render the dry coating fusible at the time of wrapping, it was briefly heated to a temperature from about 250° C to about 370° C by spot application of heat from an electrical heating element at or just prior to the wrapping point. The wrapped wire was cured at a temperature at approximately 300° C for about 30 seconds and postcured in an argon atmosphere at about 300° C for 3-6 hours. FIG. 1 shows that polyimide wrapped wire, using the sealant of the present invention, has clearly a superior insulation resistant temperature profile as compared to polyimide tape using the sealant of the prior art. FIG. 2 dramatically shows the superiority of insulated electrical wire prepared according to the present invention as compared to the closest prior art. Whereas double wrapped wire prepared according to the prior art had shorted out at 101 hours when heated in air at 700° F, wire prepared in a comparable fashion according to the present invention, did not short out until 117 hours.

The following examples are illustrative of the present invention:

EXAMPLE 1

High purity tetraethyl ester of 3,3′4,4′ benzophenone tetracarboxylic acid (47.1 g, 0.1 mole, 99.6%) was heated under argon to 180° C and solid 3,3′,3,3′-tetraaminobenzophenone (24.2 g, 0.1 mole) was added while stirring continually. Since the amine did not melt immediately, the temperature was raised to 215° C. It took 20 minutes from the initial addition before all of the amine melted and dissolved. Stirring was continued for 30 minutes beyond this point. The reaction mixture was cooled rapidly in an ice bath and pulverized in a mortar to pass through a 40-mesh sieve. After drying in a vacuum oven overnight at 65° C, the inherent viscosity was measured and found to be 0.048 at 25° C at a concentration of 2.5 g. per 100 cc of anhydrous dimethylformamide. The prepolymer was readily soluble in dioxane.

EXAMPLE 2

The polymer prepared in Example 1 was heated and advanced to an inherent viscosity of 0.056. Then it was dissolved in anhydrous dioxane to give a 28 percent by weight solids content solution. Polyimide tape 1 mil thick and ⅜ inch wide was passed through the solution, then drawn through a drying tower at about 80° C. The tape was next drawn into a "B" staging oven at a temperature of about 260° C for further drying and to increase the degree of polymerization of the polymer. The total time in the "B" stage oven was approximately 2½ minutes. It was continually rolled onto a spool as it came out of the oven.

EXAMPLE 3

A silver plated multifilament 20 ga 19/32 copper wire was double wrapped with the coated tape produced in Example 2. Both layers were wrapped separately on a wrapping machine conventionally used in the trade. Tape layers were wrapped in opposite directions, and each layer had an overlap of approximately 50 percent. The tape was spot heated by an electrical heating element to a temperature from approximately 250° C to approximately 370° C just prior to wrapping. The wrapped wire then was passed through a curing oven at approximately 300° C for less than a minute to cure the sealant and then post cured in an argon atmosphere at approximately 300° C for 4–6 hours.

When tested electrically, the insulated wire was found to have excellent dielectric properties. Even more important was the observation that it largely retained its properties when exposed to air at approximately 285° C for over 2,000 hours and when exposed to approximately 315° C for over 800 hours.

EXAMPLE 4

In a modification of Example 3, wire was triple wrapped with the coated tape wherein each layer was reversed and each had a 50 percent overlap. Each layer added 6 mils to the diameter of the wire or 3 mils to the wall thickness. Thus the wire of Example 3 had a 6 mil wall (12 mil total insulation) whereas the wire of this Example had a 9 mil wall (18 mil total insulation). This wrapped wire was passed through a 10 foot air curing oven at approximately 315° C at a rate of 20 ft/min. giving a total exposure cure period of 30 seconds. The coated wire was subsequently postcured in a nitrogen atmosphere for 4 hours at the same temperature.

Insulation resistance as a function of temperature was determined for each of these wires and the results are shown in Table I.

TABLE I

Insulation Resistance as a Function of Temperature of the Herein Described Insulated Wires

| Temperature | | Insulation Resistance Ohms at 500 Vdc 30 inch lengths | |
|---|---|---|---|
| °F | °C | Example III | Example IV |
| 75* | 24* | $3 \times 10^{12}$ | $4 \times 10^{12}$ |
| 250 | 121 | $4 \times 10^{12}$ | $2 \times 10^{13}$ |
| 300 | 149 | $5 \times 10^{12}$ | $1 \times 10^{13}$ |
| 350 | 177 | $1 \times 10^{12}$ | $7 \times 10^{13}$ |
| 400 | 204 | $1 \times 10^{11}$ | $2 \times 10^{11}$ |
| 450 | 232 | $2 \times 10^{10}$ | $3 \times 10^{10}$ |
| 500 | 260 | $2 \times 10^{9}$ | $2 \times 10^{9}$ |
| 600 | 316 | $4 \times 10^{7}$ | $5 \times 10^{7}$ |

*Ambient temperature tests were conducted in anionic wetted water whereas all other tests were conducted in molten Cero-Tru Bi-Sn alloy.

EXAMPLE 5

A solution of high purity tetraethyl 3,3',4,4'-benzophenonetetracarboxylate (47g, 0.1 mole) in chloroform (100 ml.) was mixed with 3,3',4,4'-tetraaminobenzophenone (24 g, 0.1 mole) and the mixture was heated at reflux for several days. Periodically small samples of the reaction mixture were removed and dried in vacuum to provide samples suitable for inherent viscosity determination. When the polymerization had proceeded to the point where the inherent viscosity of the product was approximately 0.045 dl/g., the reaction was terminated and the lacquer was used to dip coat 200 feet of 1 mil Kapton polyimide tape. The coated tape was dried by drawing it through an 80° C oven and subsequently drawing it through a "B" staging oven at about 280° C to anvance the sealants degree of polymerization. It then was used to double wrap a 20 ga. 19/32 silver plated multifilament wire in a manner similar to that used in Example 3.

What is claimed is:

1. A method for producing an improved insulated conductor wire comprising:
    a. coating a layer of polyimide tape with a prepolymer having an inherent viscosity of from about 0.03 to about 0.07 at 25° C when measured at a concentration of 2.5 grams per 100 ml. of anhydrous dimethyl formamide, said prepolymer being the condensation product of a tetralower alkyl ester of 3,3',4,4'-benzophenone tetracarboxylic acid, and 3,3',4,4'-tetraaminobiphenyl;
    b. wrapping resultant coated tape around a wire strand or strands in a manner to provide overlap of said tape; and
    c. exposing resultant wrapped wire to an elevated temperature whereby said prepolymer is cured.

2. The method of claim 1 wherein multiple layers of coated polyimide tape are wrapped around conductor wire, said layers being in reverse direction to each other and each layer having approximately a 50 percent overlap.

* * * * *